US012694402B2

(12) United States Patent
Tsuda et al.

(10) Patent No.: US 12,694,402 B2
(45) Date of Patent: Jul. 28, 2026

(54) SERVICE PROVIDING SYSTEM AND SERVICE PROVIDING METHOD

(71) Applicant: NEC Corporation, Tokyo (JP)

(72) Inventors: Shunsuke Tsuda, Tokyo (JP); Hajime Hagimori, Tokyo (JP)

(73) Assignee: NEC CORPORATION, Tokyo (JP)

( * ) Notice: Subject to any disclaimer, the term of this patent is extended or adjusted under 35 U.S.C. 154(b) by 316 days.

(21) Appl. No.: 17/911,183

(22) PCT Filed: Mar. 2, 2021

(86) PCT No.: PCT/JP2021/007962
§ 371 (c)(1),
(2) Date: Sep. 13, 2022

(87) PCT Pub. No.: WO2021/199854
PCT Pub. Date: Oct. 7, 2021

(65) Prior Publication Data
US 2023/0162192 A1 May 25, 2023

(30) Foreign Application Priority Data
Mar. 31, 2020 (JP) ................................. 2020-062854

(51) Int. Cl.
*G06Q 20/40* (2012.01)
*G06Q 30/0601* (2023.01)

(52) U.S. Cl.
CPC ... *G06Q 20/40145* (2013.01); *G06Q 30/0609* (2013.01)

(58) Field of Classification Search
CPC ......... G06Q 20/40145; G06Q 30/0609; G06Q 20/0855; G06Q 20/4014; G06Q 30/01;
(Continued)

(56) References Cited

U.S. PATENT DOCUMENTS

2005/0251440 A1* 11/2005 Bednarek ........... G06Q 30/0203
705/7.32
2010/0223187 A1* 9/2010 Fujita ................... G06Q 20/027
705/17
(Continued)

FOREIGN PATENT DOCUMENTS

JP 2001-222653 A 8/2001
JP 2002-063431 A 2/2002
(Continued)

OTHER PUBLICATIONS

Love, R. (Mar. 17, 2019). Burgers, veggies, pampers and more; get them all delivered at your door. TCA Regional News Retrieved from https://dialog.proquest.com/professional/docview/2191979734? accountid=131444 (Year: 2019).*
(Continued)

*Primary Examiner* — Ashley D Preston
(74) *Attorney, Agent, or Firm* — Sughrue Mion, PLLC

(57) ABSTRACT

A service processing system according to an aspect of the present disclosure includes: at least one memory configured to store instructions; and at least one processor configured to execute the instructions to: transmit, to a terminal of an agent, a purchase instruction of a product specified by a client; acquire a payment result related to the product purchased by the agent using payment information of a business operator; and process, when receiving a notice of receipt of the product from a terminal of the client, payment with payment information of the client from the client to the business operator based on the payment result.

8 Claims, 14 Drawing Sheets

(58) Field of Classification Search
CPC ........ G06Q 50/10; G06Q 30/04; G06Q 30/06;
G06Q 30/0617; G06Q 30/08; G06Q
30/0601–0645
USPC .............................................. 705/26.1–27.2
See application file for complete search history.

(56)                    References Cited

U.S. PATENT DOCUMENTS

| 2017/0069013 A1* | 3/2017 | Castillo ................. G06Q 50/01 |
| 2021/0118029 A1* | 4/2021 | Koritala ........... G06Q 10/08345 |

FOREIGN PATENT DOCUMENTS

| JP | 2010-152841 A | 7/2010 |
| JP | 2015-232826 A | 12/2015 |
| JP | 2018-156526 A | 10/2018 |

OTHER PUBLICATIONS

Obi Ogbanufe, Dan J. Kim, Comparing fingerprint-based biometrics authentication versus traditional authentication methods for e-payment, Decision Support Systems, vol. 106 (2018) (Year: 2018).*
International Search Report for PCT Application No. PCT/JP2021/007962, mailed on May 25, 2021.
English translation of Written opinion for PCT Application No. PCT/JP2021/007962, mailed on May 25, 2021.
Hiromatsu, "077 Instacart Grocery Shopping Agency Service", Find GAFA in 10 Years from Now, first impression of the first edition, ISBN978-4-296-10278-5, Nikkei BP, Jun. 24, 2019, pp. 225-226.

* cited by examiner

Fig.3A

CLIENT INFORMATION

| CLIENT ID | PAYMENT INFORMATION | ADDRESS |
|-----------|---------------------|---------|
| A1 | P1 | X11 |
| ⋮ | ⋮ | ⋮ |

Fig.3B

AGENT INFORMATION

| REGISTRATION ID | TERMINAL ID | CURRENT LOCATION | FIELD OF SPECIALTY | PROFILE IMAGE | USER EVALUATION |
|---|---|---|---|---|---|
| B1 | T1 | X21 | VEGETABLE | ☺ | 4.9 |
| B2 | T2 | X22 | MISCELLANE OUS GOODS | ☺ | 4.8 |
| B3 | T3 | X23 | MEET/FISH | ☺ | 4.8 |

Fig.4

REQUEST INFORMATION

| REQUEST NUMBER | REQUEST DATE AND TIME | CLIENT ID | DESTINATION | SHOPPING CONDITION | | | |
|---|---|---|---|---|---|---|---|
| 1 | XX:XX ON MARCH XX, 2020 | A1 | X11 | ... | ... | ... | ... |

| CONDITION REGARDING PRODUCT | STORE TO SHOP | BUDGET | DELIVERY DUE DATE |
|---|---|---|---|
| ... | XX STORE | 2000 YEN TO 2500 YEN | XX:XX ON MARCH XX, 2020 |

Fig.6

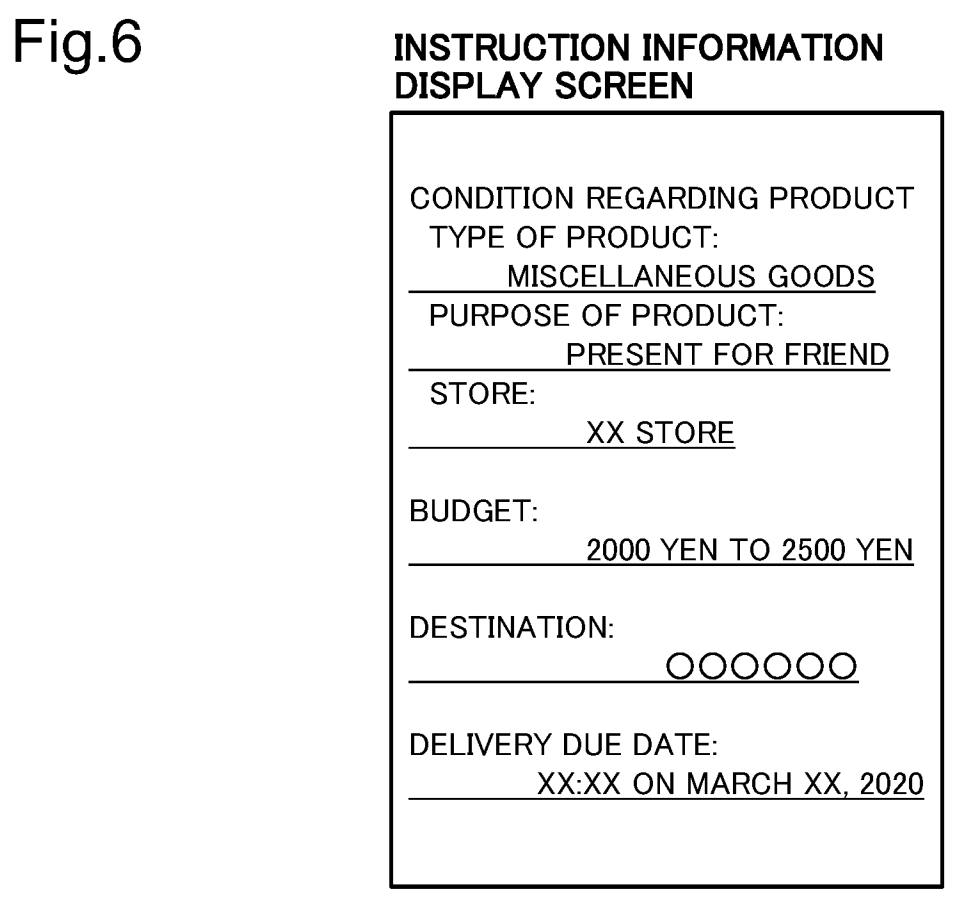

INSTRUCTION INFORMATION DISPLAY SCREEN

CONDITION REGARDING PRODUCT

TYPE OF PRODUCT:
MISCELLANEOUS GOODS

PURPOSE OF PRODUCT:
PRESENT FOR FRIEND

STORE:        XX STORE

BUDGET:        2000 YEN TO 2500 YEN

DESTINATION:        OOOOOO

DELIVERY DUE DATE:
XX:XX ON MARCH XX, 2020

CODE DISPLAY SCREEN

VALID ONLY AT XX STORE

EXPIRATION DATE: XX:XX ON MARCH XX, 2020

Fig.8

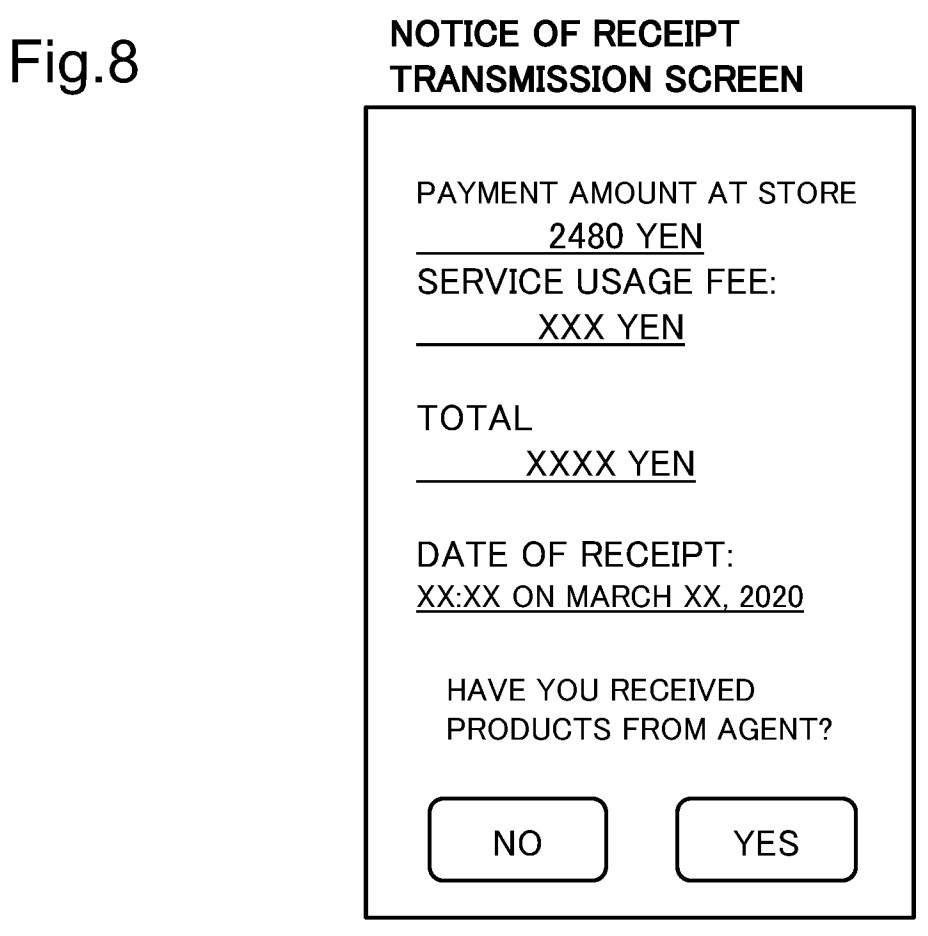

NOTICE OF RECEIPT
TRANSMISSION SCREEN

PAYMENT AMOUNT AT STORE
2480 YEN

SERVICE USAGE FEE:
XXX YEN

TOTAL
XXXX YEN

DATE OF RECEIPT:
XX:XX ON MARCH XX, 2020

HAVE YOU RECEIVED
PRODUCTS FROM AGENT?

NO     YES

Fig.9

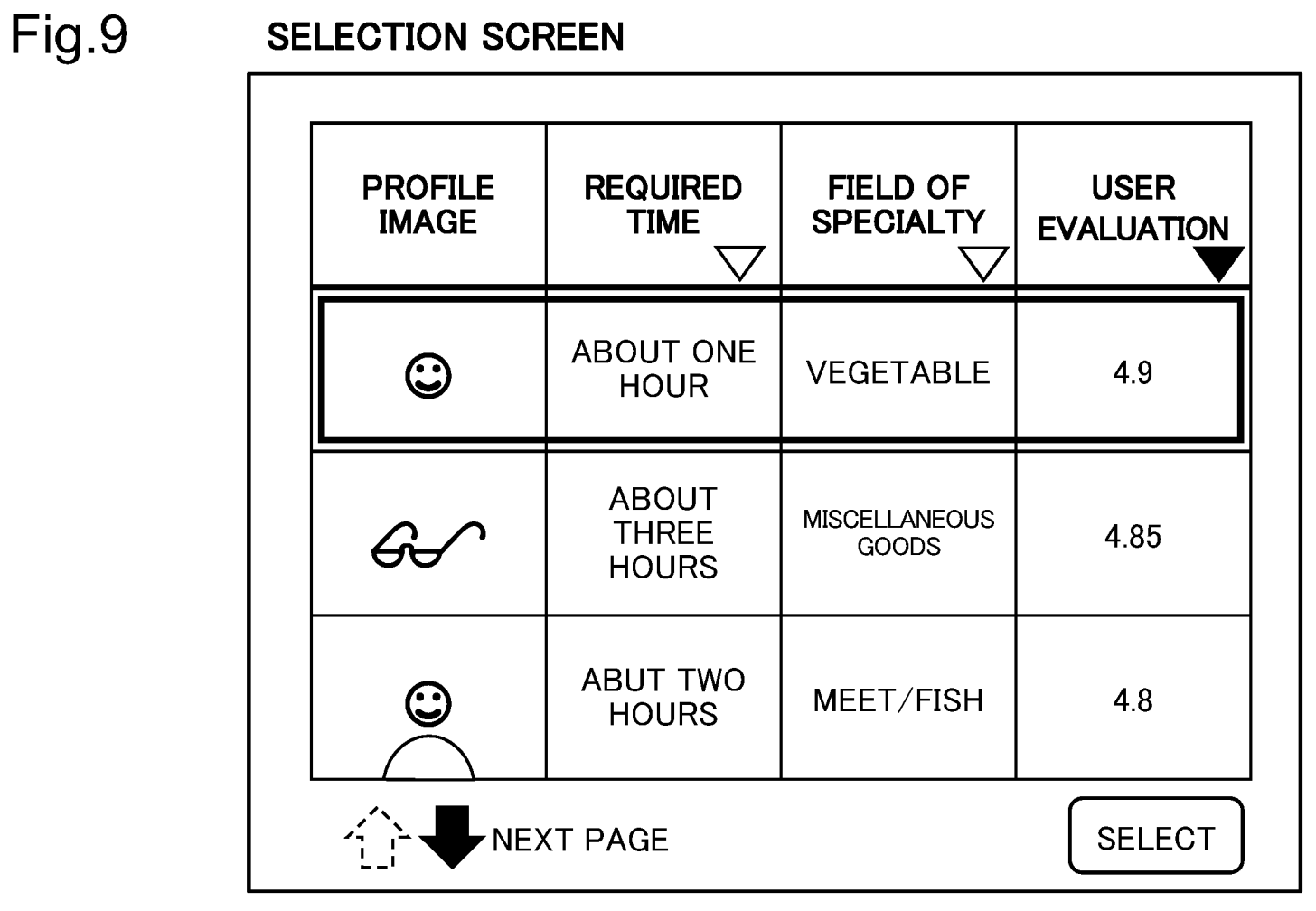

SELECTION SCREEN

| PROFILE IMAGE | REQUIRED TIME ▽ | FIELD OF SPECIALTY ▽ | USER EVALUATION ▶ |
|---|---|---|---|
| ☺ | ABOUT ONE HOUR | VEGETABLE | 4.9 |
| ৪ | ABOUT THREE HOURS | MISCELLANEOUS GOODS | 4.85 |
| ☺ | ABUT TWO HOURS | MEET/FISH | 4.8 |

NEXT PAGE ▶

SELECT

SERVICE PROVIDING SYSTEM AND SERVICE PROVIDING METHOD

This application is a National Stage Entry of PCT/JP2021/007962 filed on Mar. 2, 2021, which claims priority from Japanese Patent Application 2020-062854 filed on Mar. 31, 2020, the contents of all of which are incorporated herein by reference, in their entirety.

TECHNICAL FIELD

The present disclosure relates to a service providing system and the like.

BACKGROUND ART

Shopping in a store requires labor. For example, upon shopping, a person creates a shopping list, goes to a store, selects products to buy, pays for the products, and carries the purchased products to home. It is convenient if an agent performs such labor-intensive shopping. In shopping by an agent, how to pay for products becomes a problem.

PTL 1 discloses that code information that is identification information of an agent who acts as a purchasing agent for a purchase desiring person is transmitted to a terminal of the agent, and the identification information of the agent is registered in association with payment means information of the purchase desiring person. According to PTL 1, when the agent holds a code based on code information over a code reader in a store, the purchase desiring person can make a payment for a product acquired by the agent.

PTL 2 discloses that a storage unit of an electronic payment card with personal authentication stores biometric information of a card holder himself or herself and a registrant who is delegated by the holder. According to PTL 2, it is possible to allow a delegate other than the holder himself or herself to use the electronic payment card.

CITATION LIST

Patent Literature

[PTL 1] JP 2018-156526 A
[PTL 2] JP 2010-152841 A

SUMMARY OF INVENTION

Technical Problem

There is a case where the purchase desiring person desires to request a third party who is not an acquaintance for a shopping agent. However, in the techniques of PTL 1 and PTL 2, when the third party is requested for a shopping agent, there is a possibility that shopping not intended by the purchase desiring person is performed using the payment information of the purchase desiring person. Therefore, the client cannot request shopping with confidence.

An object of the present disclosure is to provide a service providing system, a service providing method, and a program that enable a client to request a third party for shopping with security.

Solution to Problem

A service providing system according to an aspect of the present disclosure includes an agent instruction unit configured to transmit, to a terminal of an agent, a purchase instruction of a product specified by a client, a payment result acquisition unit configured to acquire a payment result related to the product purchased by the agent using payment information of a business operator, and a payment processing unit configured to process, when receiving a notice of receipt of the product from a terminal of the client, payment with payment information of the client from the client to the business operator based on the payment result.

A service providing method according to an aspect of the present disclosure includes transmitting, to a terminal of an agent, a purchase instruction of a product specified by a client, acquiring a payment result related to the product purchased by the agent using payment information of a business operator, and processing, when receiving a notice of receipt of the product from a terminal of the client, payment with payment information of the client from the client to the business operator based on the payment result.

A program according to an aspect of the present disclosure causes a computer to execute transmitting, to a terminal of an agent, a purchase instruction of a product specified by a client, acquiring a payment result related to the product purchased by the agent using payment information of a business operator, and processing, when receiving a notice of receipt of the product from a terminal of the client, payment with payment information of the client from the client to the business operator based on the payment result.

Advantageous Effects of Invention

According to the present disclosure, a client can request a third party for shopping with security.

BRIEF DESCRIPTION OF DRAWINGS

FIG. 3A is a diagram illustrating an example of client information according to the first example embodiment.

FIG. 3B is a diagram illustrating an example of agent information according to the first example embodiment.

FIG. 4 is a diagram illustrating an example of request information according to the first example embodiment.

FIG. 6 is a diagram illustrating an example of an instruction information display screen according to the first example embodiment.

FIG. 8 is a diagram illustrating an example of a notice of receipt transmission screen according to the first example embodiment.

FIG. 9 is a view illustrating an example of a selection screen according to modification example 2 of the first example embodiment.

EXAMPLE EMBODIMENTS

Figure 1:
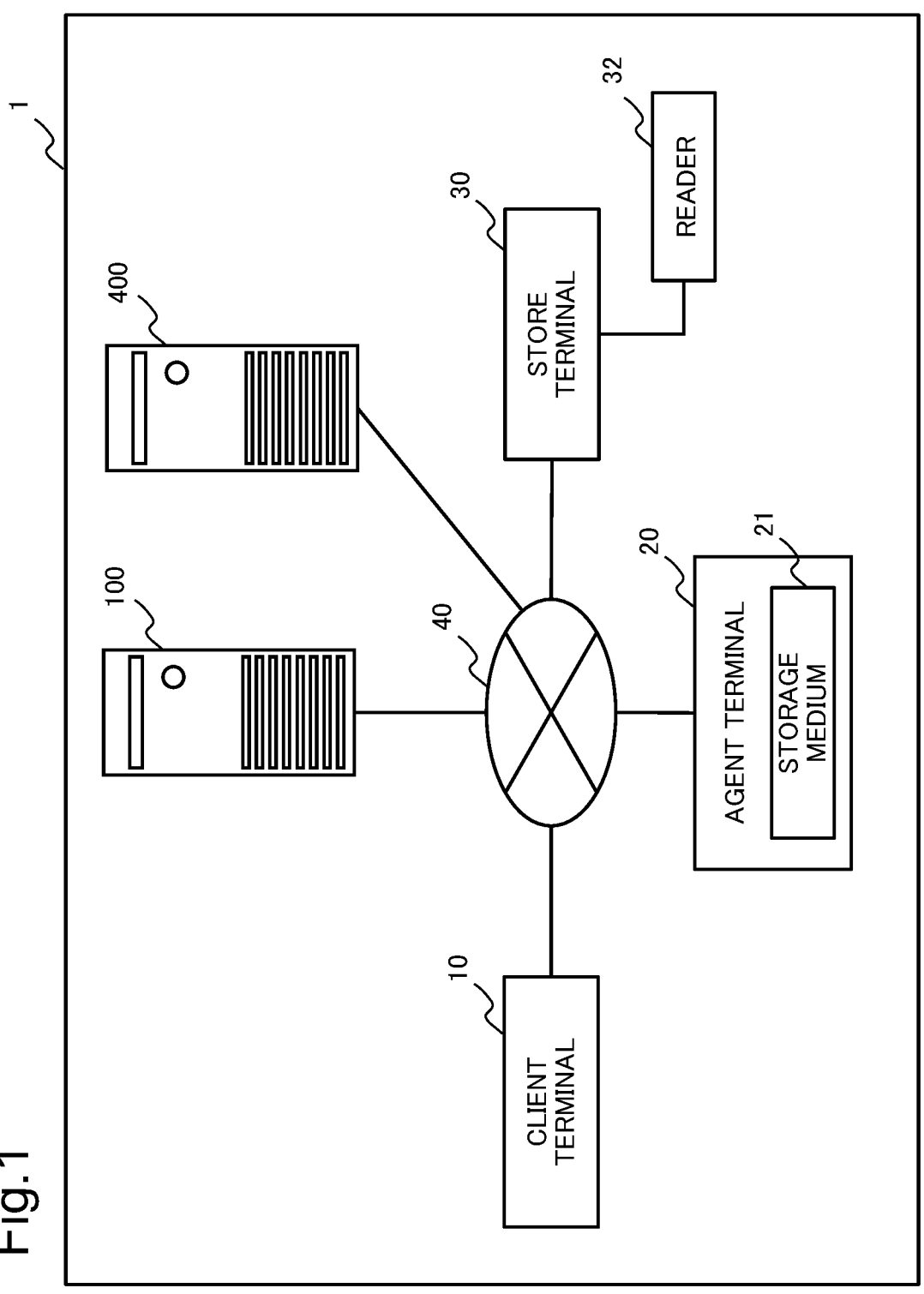
FIG. 1 is a block diagram illustrating a configuration of a service providing system 1 according to a first example embodiment.

Hereinafter, example embodiments of the present disclosure will be described with reference to the drawings, but the present disclosure is not limited to the present example embodiments. In the drawings described below, components having the same function are denoted by the same reference numerals, and repeated description thereof may be omitted.

First Example Embodiment

Configuration

FIG. 1 is a block diagram illustrating a configuration of a service providing system 1 according to a first example embodiment. The service providing system 1 includes a service providing apparatus 100, a payment server 400, a client terminal 10, an agent terminal 20, and a store terminal 30. Devices included in the service providing system 1 are connected by at least one of wired connection or wireless connection via a network 40 such as a local area network or the Internet. The service providing system 1 may include other devices.

The service providing apparatus 100 is used by a business operator that provides a shopping agency service (hereinafter, also simply referred to as a business operator). The service providing apparatus 100 is achieved on a single computer or a plurality of computers. The service providing apparatus 100 may be achieved on a cloud that is a set of computer resources.

A store, a client who requests for a shopping agent, and an agent who acts as a shopping agent on the basis of request are registered in the agency service. The agent registered in the agency service is also referred to as a registered agent. Among the registered agents, a person selected as an agent who receives an instruction of agent from the business operator is referred to as a shopping agent.

The service providing apparatus 100 issues identification information of the shopping agent associated with the payment information of the business operator to the shopping agent. The identification information of the shopping agent is information for identifying the shopping agent, and may include an identifier for identifying the request and an identifier of the registered agent. Here, the payment information of the business operator is information of a payment means associated with a bank account used for payment by the business operator, and is, for example, a membership ID (identifier) of a code payment issued to the business operator, a membership ID of an electronic payment card, or a membership number of a credit card. The payment information may be a bank account of the business operator.

The identification information of the shopping agent is recorded in a storage medium 21 such as an integrated circuit (IC) card or a mobile terminal carried by the registered agent. In the first example embodiment, a case where the storage medium 21 is incorporated in the agent terminal 20 will be described. In the first example embodiment, the identification information of the shopping agent is represented by, for example, a code encoded by a freely-selected method such as a bar code or a two-dimensional code. Instead of the identification information, information for acquiring the identification information such as a uniform resource locator (URL) associated with the identification information may be recorded in the storage medium 21.

Figure 2:
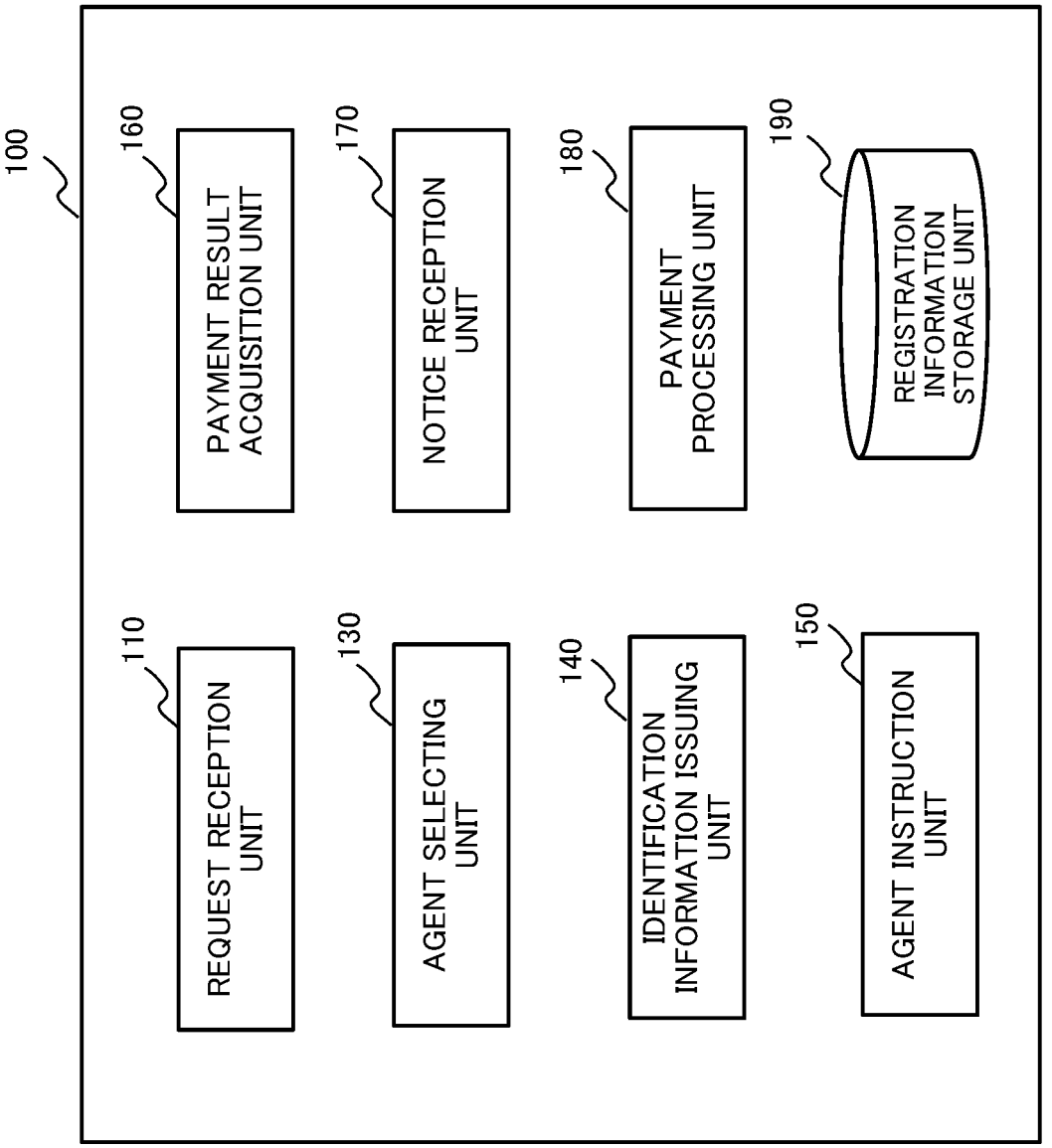
FIG. 2 is a block diagram illustrating a configuration of a service providing apparatus 100 according to the first example embodiment.
Figure 5A:
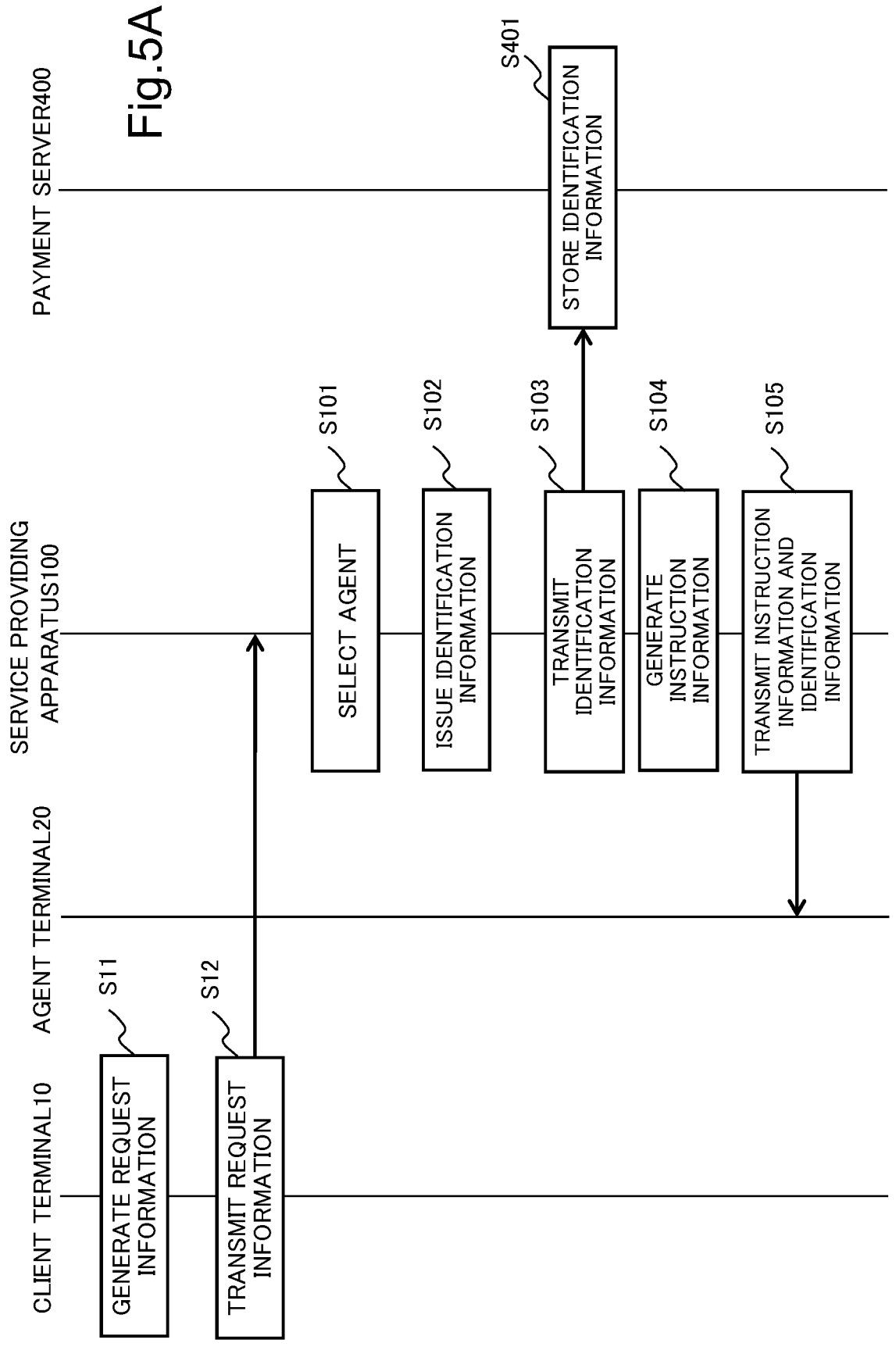
FIG. 5A is a sequence diagram illustrating an operation of the service providing system 1 according to the first example embodiment.
Figure 5B:
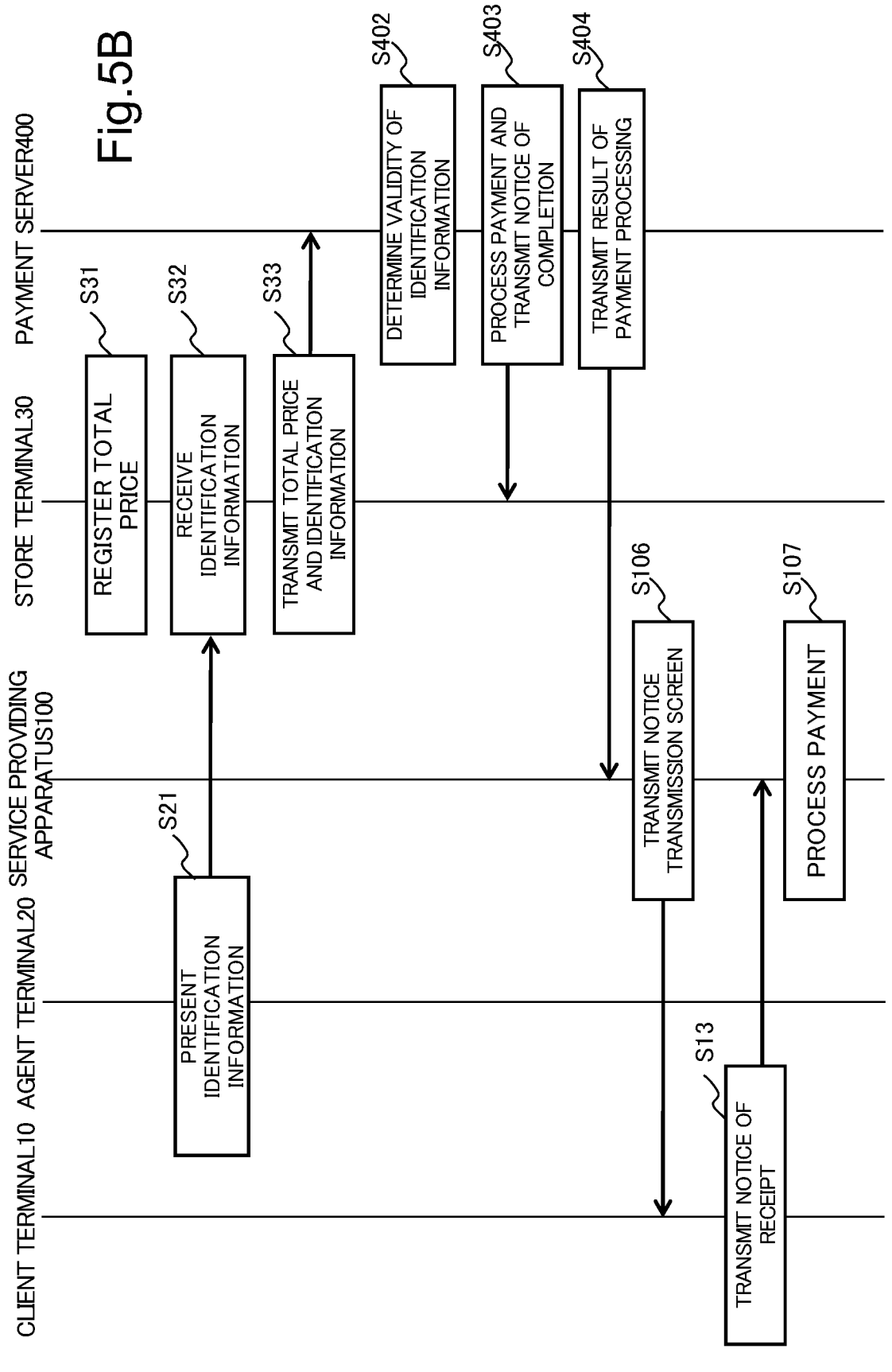
FIG. 5B is a sequence diagram illustrating an operation (continuation) of the service providing system 1 according to the first example embodiment.

FIG. 2 is a block diagram illustrating a configuration of the service providing apparatus 100 according to the first example embodiment. The service providing apparatus 100 includes a request reception unit 110, an agent selecting unit 130, an identification information issuing unit 140, an agent instruction unit 150, a payment result acquisition unit 160, a notice reception unit 170, and a payment processing unit 180. The service providing apparatus 100 includes a registration information storage unit 190 as a storage unit.

The registration information storage unit 190 stores client information and agent information.

The client information is information regarding a client registered in the agency service. FIG. 3A is a diagram illustrating an example of the client information. As illustrated in FIG. 3A, the client information includes a client ID, payment information of the client, and an address of the client. The client ID is an identifier for identifying each client. The payment information of the client is, for example, a credit card number of the client, a bank account number, or the like. The address of the client can be used as a destination of a product purchased by the shopping agent.

The agent information is information regarding a registered agent registered in the agency service. FIG. 3B is a diagram illustrating an example of the agent information. As illustrated in FIG. 3B, the agent information includes the registration ID of each registered agent and the terminal ID of the agent terminal 20 carried by the registered agent. The registration ID is an identifier for identifying each registered agent. The terminal ID is used to transmit instruction information to be described later to the agent terminal 20. Further, in the first example embodiment, the terminal ID is used to transmit the identification information to the agent terminal 20 which is the storage medium 21.

Further, the agent information may include a current location of the registered agent, a field of specialty in shopping, a profile image, user evaluation of the agent, and other information regarding an attribute of the agent.

The current location of the registered agent is position information of the registered agent received from the agent terminal 20. Upon receiving the position information at regular time intervals, the service providing apparatus 100 updates the agent information stored in the registration information storage unit 190.

The field of specialty in shopping is, for example, a category of product that the registered agent is good at or an area that the registered agent is good at. If the request content matches the field of specialty, the user can request a registered agent who is familiar with the category of the product or the area for shopping. The profile image is an image indicating the registered agent. The registered agent can appropriately set the field of specialty and the profile image. The user evaluation is, for example, an average of evaluations from clients who have made a shopping request to the registered agent in the past.

The registration information storage unit 190 further stores the position information of the store set by a freely-selected method.

The request reception unit 110 receives request information from the client terminal 10. The request information indicates a condition related to shopping requested by the client. FIG. 4 is a diagram illustrating an example of request information. As illustrated in FIG. 4, the request information includes a request number, a request date and time, a client ID, a destination, and a shopping condition. The request number is an identifier for identifying the request. The shopping condition is a condition for shopping that can be appropriately set by the client. The shopping condition may include, for example, a condition related to a product, a store where shopping is performed, a budget, and a delivery due date. The destination is a delivery place of the purchased product desired by the client.

The condition related to the product is used for selection of the shopping agent based on the field of specialty of the registered agent or selection of the product by the shopping agent. The condition related to the product may be a product name unique to the product that the client desires to purchase, or may be a type of the product or use of the product. The type of the product is, for example, a product name without specifying a brand, or vegetables, meat, miscellaneous goods, and the like, and the use of the product is, for example, an ingredient for dinner for four people for this evening.

The store where shopping is performed is, for example, a name of a store where the client desires to purchase the product, and the shopping agent performs shopping at the store. The store where shopping is performed is used for selection of the shopping agent based on the current location of the registered agent or selection of a product by the shopping agent. Instead of a store name, the client may specify an area name as the store where shopping is performed. The shopping agent performs shopping in the specified area.

The budget includes a lower limit and/or an upper limit of the purchase price. The shopping agent selects a product at the store so that shopping can be done within the budget.

The delivery due date is a date and time of a due date for delivering the purchased product to the destination. The delivery due date is used, for example, for selection of the shopping agent based on the current location of the registered agent.

In FIG. 4, the request information includes a destination, but the request reception unit 110 may specify the destination of the product on the basis of the client ID included in the request information and the address of the client included in the client information stored in the registration information storage unit 190.

The agent selecting unit 130 selects a shopping agent who instructs shopping on the basis of the request information and the agent information. That is, the agent selecting unit 130 selects the shopping agent on the basis of the shopping condition requested by the client and the condition of the registered agent. For example, the agent selecting unit 130 may calculate the sum of the distance from the current location of the registered agent stored in the agent information to the store included in the request information, and the distance from the store to the destination, and select a registered agent having the smallest total moving distance. The agent selecting unit 130 may calculate required times for agents to shop using the total moving distance, and select a registered agent having the smallest required time. The agent selecting unit 130 may select a registered agent who can perform delivery within the delivery due date included in the request information.

The agent selecting unit 130 can select a shopping agent by any other method. For example, the agent selecting unit 130 may select a registered agent whose condition related to the product included in the request information is included in the field of specialty included in the agent information. When there is a time until the delivery due date, for example, the delivery due date is the next day or later, the agent selecting unit 130 may select the shopping agent on the basis of future position information in the future of the registered agent. In this case, a schedule related to the position information in the future of the registered agent is stored in the agent information. The agent selecting unit 130 refers to the request information and the agent information, and selects, for example, a registered agent whose future position is close to the address of the store where the specified shopping is performed and who can deliver the purchased product by the delivery due date.

The identification information issuing unit 140 issues identification information of the shopping agent associated with the payment information of the business operator to the shopping agent. The identification information issuing unit 140 transmits the issued identification information to the agent instruction unit 150 and the payment server 400. Upon receiving the identification information, the payment server 400 stores the identification information.

The identification information issuing unit 140 may transmit an upper limit amount of use, the expiration date, or the shopping condition to the payment server 400 together with the identification information. The upper limit amount of use is, for example, the upper limit of the budget included in the request information. The expiration date may be the same as the delivery due date included in the request information. Further, the identification information issuing unit 140 may transmit an available store name, which is a store name included in the request information, to the payment server 400.

The agent instruction unit 150 generates instruction information related to the shopping request on the basis of the request information, and transmits the instruction information to the agent terminal 20 of the shopping agent. The instruction information includes a shopping condition and a destination. The instruction information is also called a purchase instruction of a product specified by the client. Further, the agent instruction unit 150 transmits the identification information issued by the identification information issuing unit 140 to the agent terminal 20 of the shopping agent.

The payment result acquisition unit 160 receives, from the payment server 400, a result of payment processing including a total payment amount to the store for products purchased by the shopping agent. The result of the payment processing received by the payment result acquisition unit 160 has a role of notifying the service providing apparatus 100 of the fact that the shopping agent performed shopping at the store and the payment amount to the store. The result of the payment processing is also referred to as a payment result.

The notice reception unit 170 receives a notice of receipt of a product from the client terminal 10. The notice of receipt received by the notice reception unit 170 has a role of notifying the service providing apparatus 100 that the shopping agent has delivered the product to the client.

Upon receiving the notice of receipt, the payment processing unit 180 processes payment to the business operator using the payment information of the client.

The client terminal 10 is a terminal used by a client who requests for a shopping agent. The client terminal 10 generates the above-described request information and transmits the request information to the service providing apparatus 100. Further, when the client receives the product related to the shopping request, the client terminal 10 transmits a notice of receipt to the service providing apparatus 100. The notice of receipt may include an evaluation of shopping performed by the shopping agent.

The agent terminal 20 is a terminal used by the shopping agent. The agent terminal 20 receives instruction information regarding the shopping request from the service providing apparatus 100. The shopping agent selects a product to be purchased at the store based on the instruction information. Further, in the first example embodiment, the identification information issued by the service providing apparatus 100 is written in the storage medium 21 incorporated in the agent terminal 20. The agent terminal 20 displays a code representing the identification information. The shopping agent causes a reader 32 to read the code displayed on the agent terminal 20 in order to perform the checkout processing for the product selected in the store.

The agent terminal 20 may transmit position information detected by a global positioning system (GPS) to the service providing apparatus 100 at regular time intervals.

The store terminal 30 is a terminal that is installed in a store and communicates with the payment server 400 to perform checkout processing of a product. The store terminal 30 registers the total price of products selected by the shopping agent, and performs checkout processing using the payment information of the business operator on the basis of the identification information indicated in the agent terminal 20 (storage medium 21). The store terminal 30 may be either one used by a store clerk or one used by a shopping agent.

A reader 32 is connected to the store terminal 30 so as to be able to communicate therewith in a wired or wireless manner in order to read the identification information presented by the shopping agent on the agent terminal 20 (storage medium 21). The reader 32 transmits the identification information read from the agent terminal 20 (storage medium 21) to the store terminal 30. The store terminal 30 transmits the identification information read by the reader 32 to the payment server 400.

The payment server 400 is used for payment processing of the product selected by the shopping agent based on the identification information presented by the shopping agent. A payment business operator using the payment server 400 of the store and the business operator may be the same as or different from the business operator using the service providing apparatus 100.

The payment server 400 determines whether the identification information received from the store terminal 30 is valid. Specifically, it is determined whether the identification information received from store terminal 30 matches the identification information received from identification information issuing unit 140. When it is determined that they match, the payment server 400 determines that the identification information is valid. When the identification information is valid, the payment server 400 uses the payment information of the business operator associated with the identification information to process the payment related to the payment from the business operator to the store. The payment server 400 transmits a notice of completion of the payment processing to the store terminal 30, and when the store terminal 30 receives the notice of completion, the checkout processing in the store terminal 30 ends.

After the completion of the payment processing, the payment server 400 transmits a result of the payment processing including the identification information of the shopping agent and the total payment amount to the store to the service providing apparatus 100.

The payment server 400 may use the total price of products received from the store terminal 30, the reading date and time of the identification information, or the store name to determine whether the identification information is valid. In this case, for example, when the total price does not exceed the upper limit amount of use and the reading date and time of the identification information does not exceed the expiration date, the payment server 400 determines that the identification information is valid. The payment server 400 may determine that the identification information is valid when the store name received from the store terminal 30 matches the available store name.

Further, the payment server 400 may determine whether the product selected by the shopping agent in the store matches the product name or the product type included in the shopping condition. In this case, the store terminal 30 acquires the identifier of the selected product on the basis of the barcode or the like of the product. Next, the store terminal 30 refers to the product database of the store on the basis of the identifier of the product, identifies the product name or the type of the product, and transmits the product name or the type of the product to the payment server 400. The payment server 400 then compares the shopping condition with the product name or the product type received from the store terminal 30, and transmits the fact that the identification information is valid to the store terminal 30 when the shopping condition and the product name or the product type are matched.

The determination of whether the identification information presented by the shopping agent is valid can also be executed by the store terminal 30. At this time, information for determination by the store terminal 30 (upper limit amount of use, expiration date, shopping condition, and the like) may be stored in the agent terminal 20 (storage medium 21) presented by the shopping agent.

Operation

Hereinafter, an operation of the service providing system 1 according to the first example embodiment will be described with reference to the drawings. FIGS. 5A and 5B are sequence diagrams illustrating an operation of the service providing system 1 according to the first example embodiment.

The client terminal 10 generates the request information illustrated in FIG. 4 on the basis of the input of the request content from the client (step S11) and transmits the request information to the service providing apparatus 100 (step S12).

The request reception unit 110 receives the request information from the client terminal 10.

The agent selecting unit 130 selects a shopping agent to whom the shopping is to be instructed on the basis of the request information received by the request reception unit 110 and the agent information illustrated in FIG. 3B (step S101).

The identification information issuing unit 140 issues the identification information (step S102) and transmits the identification information to the payment server 400 (step S103).

The payment server 400 stores the received identification information (step S401).

The agent instruction unit 150 generates the instruction information (step S104), and transmits the instruction information and the identification information to the agent terminal 20 of the shopping agent (step S105). FIG. 6 is a diagram illustrating an example of an instruction information display screen displayed on the agent terminal 20. In FIG. 6, a shopping condition and a destination are displayed on the instruction information display screen, and the shopping condition includes a condition related to a product, a budget, and a delivery due date.

The shopping agent selects a product in the store on the basis of the shopping condition included in the instruction information.

Figure 7:
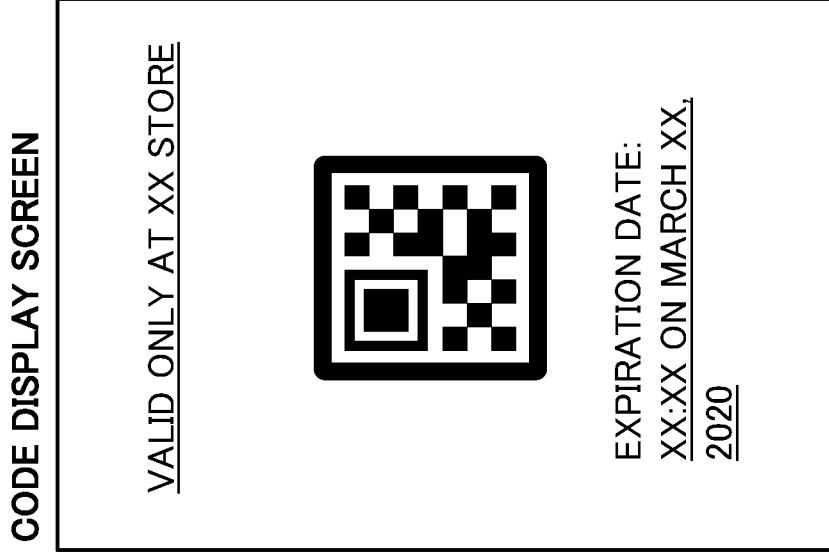
FIG. 7 is a diagram illustrating an example of an identification information display screen according to the first example embodiment.

Next, the store terminal 30 executes checkout processing. Specifically, the total price of the product selected by the shopping agent is registered (step S31). The agent terminal 20 presents the identification information and causes the reader 32 to read the identification information (step S21). FIG. 7 is a diagram illustrating an example of an identification information display screen displayed on the agent terminal 20. The store terminal 30 receives the identification information presented by the shopping agent from the reader 32 (step S32). Next, the store terminal 30 transmits the total price and the identification information to the payment server 400 (step S33).

The payment server 400 determines the validity of the identification information (step S402). Specifically, the payment server 400 compares the identification information stored in step S401 with the identification information received from the store terminal 30, and determines that the identification information is valid when they match. When the identification information is valid, the payment server 400 processes the payment related to the payment from the business operator to the store using the payment information of the business operator associated with the identification information, and transmits a notice of completion of the payment processing to the store terminal 30 (step S403). Upon receiving the notice of completion from the payment server 400, the store terminal 30 ends the checkout processing.

The payment server 400 transmits a result of the payment processing to the service providing apparatus 100 (step S404). When the payment result acquisition unit 160 acquires the result of the payment processing, the payment processing unit 180 transmits a notice of receipt transmission screen to the client terminal 10 (step S106). FIG. 8 is a diagram illustrating an example of a notice of receipt transmission screen.

The shopping agent delivers the purchased product to the client on the basis of the destination included in the instruction information.

When the client receives the product related to the shopping request, the client terminal 10 transmits a notice of receipt to the service providing apparatus 100. For example, when "Yes" is selected on the transmission screen of FIG. 8, the client terminal 10 transmits the notice of receipt.

The notice reception unit 170 receives the notice of receipt from the client terminal 10.

When the notice of receipt is received, the payment processing unit 180 processes the payment related to the payment to the business operator using the payment information of the client (step S107).

Thus, the operation of the first example embodiment is completed.

For example, the client pays the business operator an amount obtained by adding the agency service usage fee to the total payment amount to the store. For example, after receiving the notice of receipt from the client, the business operator may pay a consideration for the shopping performed to the shopping agent.

When the client refuses the receipt, the shopping agent returns the returnable product to the store. If the product cannot be returned, the business operator may keep the product. The shopping agent may purchase the product whose receipt is rejected from the business operator at its own cost.

Effects

According to the first example embodiment, the client can request a third party for shopping with security. A reason for this is because the payment result acquisition unit 160 acquires the payment result with the payment information of the business operator from the business operator to the store regarding the purchase of the product in the store by the agent. Another reason for this is because, when receiving the notice of receipt of the product from the client terminal 10, the payment processing unit 180 processes the payment with the payment information of the client from the client to the business operator on the basis of the payment result.

According to the first example embodiment, the client can request a third party for shopping under the condition of what the client desires to purchase. The reason for this is that a condition of what is desired to purchase is sent to the shopping agent. Thus, the shopping agent can select a store or a product that meets the condition of the client.

Modification Example 1

When the storage medium 21 is incorporated in the agent terminal 20, the identification information does not have to be displayed on the agent terminal 20. For example, the identification information may be stored in the agent terminal 20 and transmitted to the reader 32 by short-range wireless communication such as near field communication (NFC).

The business operator may allow the shopping agent to use, for example, an electronic payment card in an IC card format or a magnetic card format as the storage medium 21 that stores the identification information in advance. In this case, the identification information is, for example, a membership ID or a card number of an electronic payment card issued to a business operator. Hereinafter, an operation of the service providing system 1 in a case of using the electronic payment card will be described.

When the shopping agent is selected in step S101, the identification information issuing unit 140 transmits the identification information of the electronic payment card carried by the shopping agent to the payment server 400. In step S105, the agent instruction unit 150 does not have to transmit the identification information to the agent terminal 20. In step S401, the payment server 400 stores the identification information so that checkout processing in the store can be performed using the electronic payment card carried by the shopping agent.

In the store, the shopping agent presents the electronic payment card to the reader 32. In step S32, the store terminal 30 receives the identification information included in the electronic payment card from the reader 32. Thereafter, the service providing system 1 operates similarly to the operation described in the first example embodiment.

Modification Example 2

The agent selecting unit 130 may select a shopping agent candidate that can receive the request from the registered agent registered in the agent information. At this time, for example, the agent selecting unit 130 displays shopping agent candidates on the client terminal 10, and outputs a selection screen for receiving a selection of the shopping agent. FIG. 9 is a diagram illustrating an example of a selection screen according to modification example 2. As illustrated in FIG. 9, items such as a required time until delivery, a profile image, a field of specialty, and an evaluation value of the user on past shopping by the agent may be output on the selection screen for each shopping agent. The agent selecting unit 130 may appropriately rearrange or narrow down the shopping agent candidates according to an operation on the client terminal 10 from the client.

When a shopping agent is selected by the client, the client terminal 10 transmits request information including the registration ID of the selected shopping agent to the request reception unit 110. The agent selecting unit 130 selects the registered agent of the registration ID included in the request information as the shopping agent.

After the request reception unit 110 receives the request information not including the selection of the shopping agent, the agent selecting unit 130 may calculate the score for each registered agent on the basis of the degree of coincidence of each item included in the agent information and the request information. For example, the agent selecting unit 130 may calculate a higher score as the required time for shopping is shorter or the user evaluation value is higher. The agent selecting unit 130 may set a candidate for the shopping agent having the highest score as the shopping agent on the basis of the calculated score.

The agent selecting unit 130 may output a selection screen in which shopping agent candidates are listed in descending order of scores. In this case, when a shopping agent is selected by the client, the client terminal 10 transmits the registration ID of the selected shopping agent to the request reception unit 110.

Modification Example 3

In the checkout processing in the store terminal 30, the biometric authentication of the shopping agent may be performed. In this case, in addition to the identification information, biometric information of the shopping agent is stored in the storage medium 21. In modification example 3, an electronic payment card with personal authentication disclosed in PTL 2 may be used.

The biometric information may be a feature amount calculated from image data of a region including the face of the registered agent, or may be image data itself of a region including the face of the registered agent. Information other than the data of the face image may be used for authentication of the shopping agent in the store terminal 30. For example, the store terminal 30 may use biometric information such as an iris, veins, and a fingerprint for authentication of the shopping agent.

A camera is connected to the store terminal 30 communicably in a wired or wireless manner in order to acquire the biometric information of the shopping agent who presents the storage medium 21.

Processing of the service providing system 1 according to modification example 3 will be described. In the checkout processing, the store terminal 30 receives the image data from the camera and extracts the biometric information. Further, the store terminal 30 receives the biometric information stored in the storage medium 21 in addition to the identification information from the reader 32. Next, the store terminal 30 checks the received biometric information against the biometric information acquired on the basis of the image data. In a case where the biometric information matches, the store terminal 30 authenticates the shopping agent, executes the processing in and after step S33 similarly to the first example embodiment, and processes checkout based on the identification information indicated in the storage medium 21.

According to modification example 3, it is possible to authenticate that the person who presents the storage medium 21 in the store terminal 30 is the shopping agent who has received the shopping request.

The biometric information stored in the storage medium 21 may be a URL associated with the biometric information of the shopping agent or an identifier for identifying information.

Modification Example 4

In modification example 3, the case where the store terminal 30 authenticates the shopping agent has been described, but the authentication of the shopping agent may be performed by the payment server 400 together with determination of the validity of the identification information. In addition, the biometric information is not necessary to be included in the storage medium 21. In this case, the agent information stored in the registration information storage unit 190 includes the biometric information of the registered agent.

Processing of the service providing system 1 according to modification example 4 will be described. In step S103, in addition to the identification information, the identification information issuing unit 140 transmits the biometric information of the shopping agent stored in the registration information storage unit 190 to the payment server 400. The payment server 400 stores the biometric information of the shopping agent in association with the registration ID.

In the checkout processing, the store terminal 30 transmits an authentication request of the shopping agent including the image data to the payment server 400. The payment server 400 receives the authentication request from the store terminal 30, and extracts the biometric information from the image data included in the authentication request. The payment server 400 compares the stored biometric information with the biometric information included in the authentication request. When the biometric information matches as a result of the comparison, the shopping agent is authenticated, and it is determined that the identification information is valid.

Modification Example 5

In the service providing system 1, instead of using the storage medium 21 that stores the identification information, payment processing using the biometric information of the shopping agent may be executed. In this case, in step S103, the identification information issuing unit 140 transmits the biometric information of the shopping agent, the registration ID, and the payment information of the business operator to the payment server 400. The payment server 400 stores the biometric information of the shopping agent, the registration ID, and the payment information of the business operator in association with each other.

In the checkout processing, the store terminal 30 receives the biometric information of the shopping agent from the camera with a configuration similar to that of modification example 3 without executing step S32. Next, in step S33, the store terminal 30 transmits an authentication request including the total price and the biometric information to the payment server 400.

The payment server 400 compares the stored biometric information of the shopping agent with the biometric information included in the authentication request. When the biometric information matches as a result of the comparison, the shopping agent is authenticated, and the authentication result is transmitted to the store terminal 30. When the shopping agent is authenticated, the store terminal 30 ends the checkout processing.

Modification Example 6

The agent terminal 20 or the store terminal 30 may acquire an image obtained by capturing a product or an identifier of the product, and transmit, to the client terminal 10, data related to the product selected by the shopping agent in the store. Specifically, the data related to the product is, for example, an identifier of the product, a product name, a product image, and a web page introducing the product.

The client terminal 10 may display data related to the product to the client, receive an input of a purchase permission of the product selected by the agent, and transmit the purchase permission to the agent terminal 20, the store terminal 30, or the payment server 400. For example, the shopping agent sees the purchase permission received by the agent terminal 20 and starts the checkout processing in the store. For example, upon receiving the purchase permission, the store terminal 30 executes checkout processing. For example, upon receiving the purchase permission, the payment server 400 determines that the identification information is valid.

Second Example Embodiment

Next, a service providing system 1 according to a second example embodiment will be described with reference to the drawings. The service providing system 1 is used for payment processing of an agent purchase service of a product. Hereinafter, an outline of the agent purchase service of the product will be described.

The client requests a business operator who intermediates agent purchase of a product to perform the agent purchase of the product. The business operator instructs the agent to purchase the product specified by the client. The agent purchases the product at the store with the payment information of the business operator, and delivers the purchased product to the client. The agent may request a delivery company to deliver the purchased product. After the client receives the product, the business operator performs payment processing with the payment information of the client of the agent purchase service of the product.

Configuration

Figure 10:
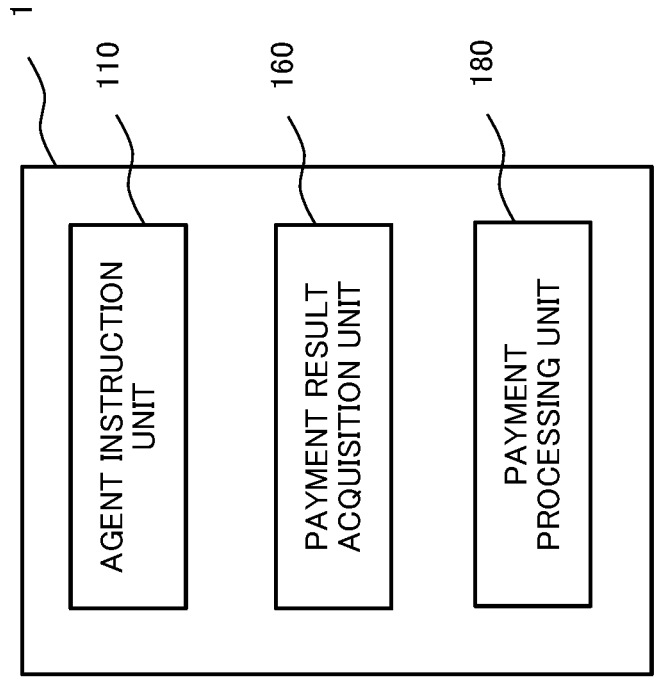
FIG. 10 is a block diagram illustrating a configuration of a service providing system 1 according to a second example embodiment.

FIG. 10 is a block diagram illustrating a configuration of the service providing system 1 according to the second example embodiment. The service providing system 1 includes the agent instruction unit 150, the payment result acquisition unit 160, and the payment processing unit 180.

The agent instruction unit 150 transmits the purchase instruction of the product specified by the client to the terminal of the agent.

The payment result acquisition unit 160 acquires a payment result related to the product purchased by the agent using the payment information of the business operator. The payment result is a result related to payment processing between the business operator and the store. The payment result includes, for example, the total amount of the purchased products. The payment result may include a date and time when the payment is completed, a store where the product is purchased, an identifier of the purchased product, and the like.

When receiving a notice of receipt of the product from the terminal of the client, the payment processing unit 180 processes payment with the payment information of the client from the client to the business operator on the basis of the payment result.

Operation

Hereinafter, an operation of the service providing system 1 according to the second example embodiment will be described with reference to the drawings.

Figure 11:
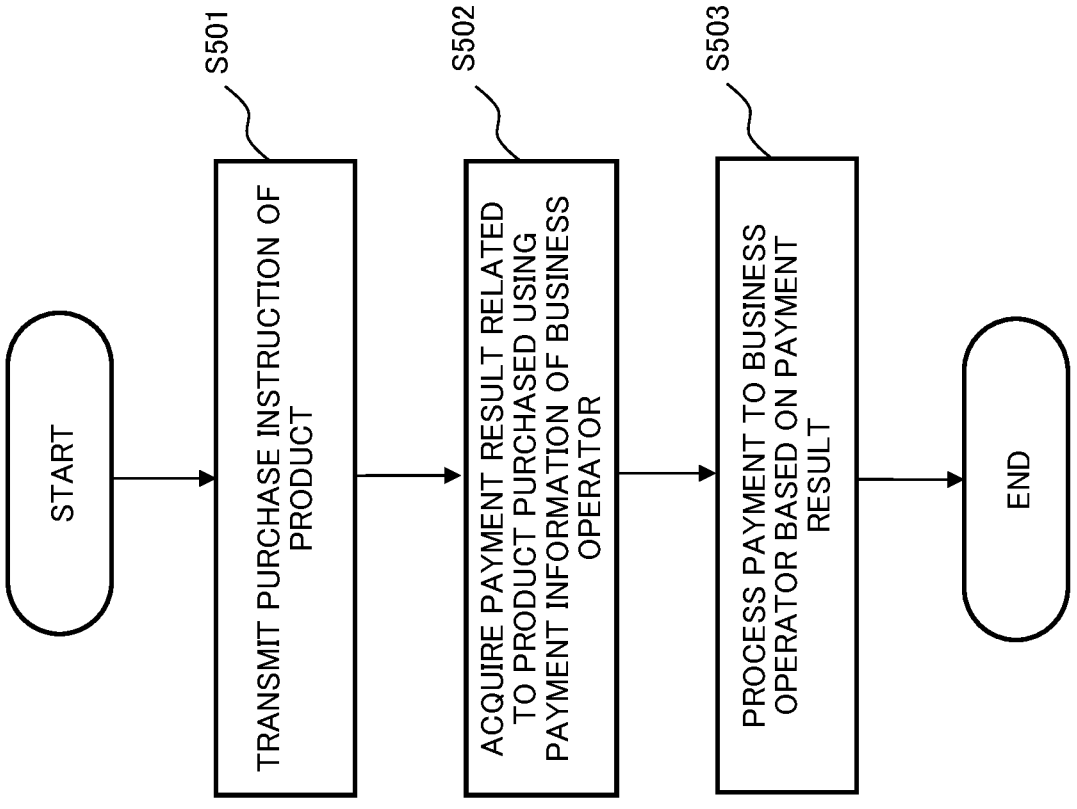
FIG. 11 is a flowchart illustrating an operation of the service providing system 1 according to the second example embodiment.

FIG. 11 is a flowchart illustrating an operation of the service providing system 1 according to the second example embodiment.

The agent instruction unit 150 transmits the purchase instruction of a product specified by the client to the terminal of the agent (step S501).

The payment result acquisition unit 160 acquires a payment result related to the product purchased by the agent using the payment information of the business operator (step S502).

When receiving a notice of receipt of the product from the terminal of the client, the payment processing unit 180 processes payment with the payment information of the client from the client to the business operator on the basis of the payment result (step S503).

Effects

With the service providing system 1 according to the second example embodiment, the client can request a third party for shopping with security. A reason for this is because the payment result acquisition unit 160 acquires the payment result related to the product purchased by the agent using the payment information of the business operator. When the agent purchases the product at the store, the payment is made with the payment information of the business operator, and even if the agent purchases a product not intended by the client at the store, the payment is not directly made by the client.

Another reason for this is because, when receiving the notice of receipt of the product from the terminal of the client, the payment processing unit 180 processes the payment with the payment information of the client from the client to the business operator on the basis of the payment result. Since the payment processing is performed with the payment information of the client after the client receives the product requested for purchase, there is no possibility that the product will not arrive even if the payment processing is performed.

Hardware Configuration Example

In each of the above-described example embodiments, each component of the service providing apparatus 100 and the service providing system 1 indicates a block of a functional unit. Some or all of the components of each device may be achieved by any combination of a computer 500 and a program.

Figure 12:
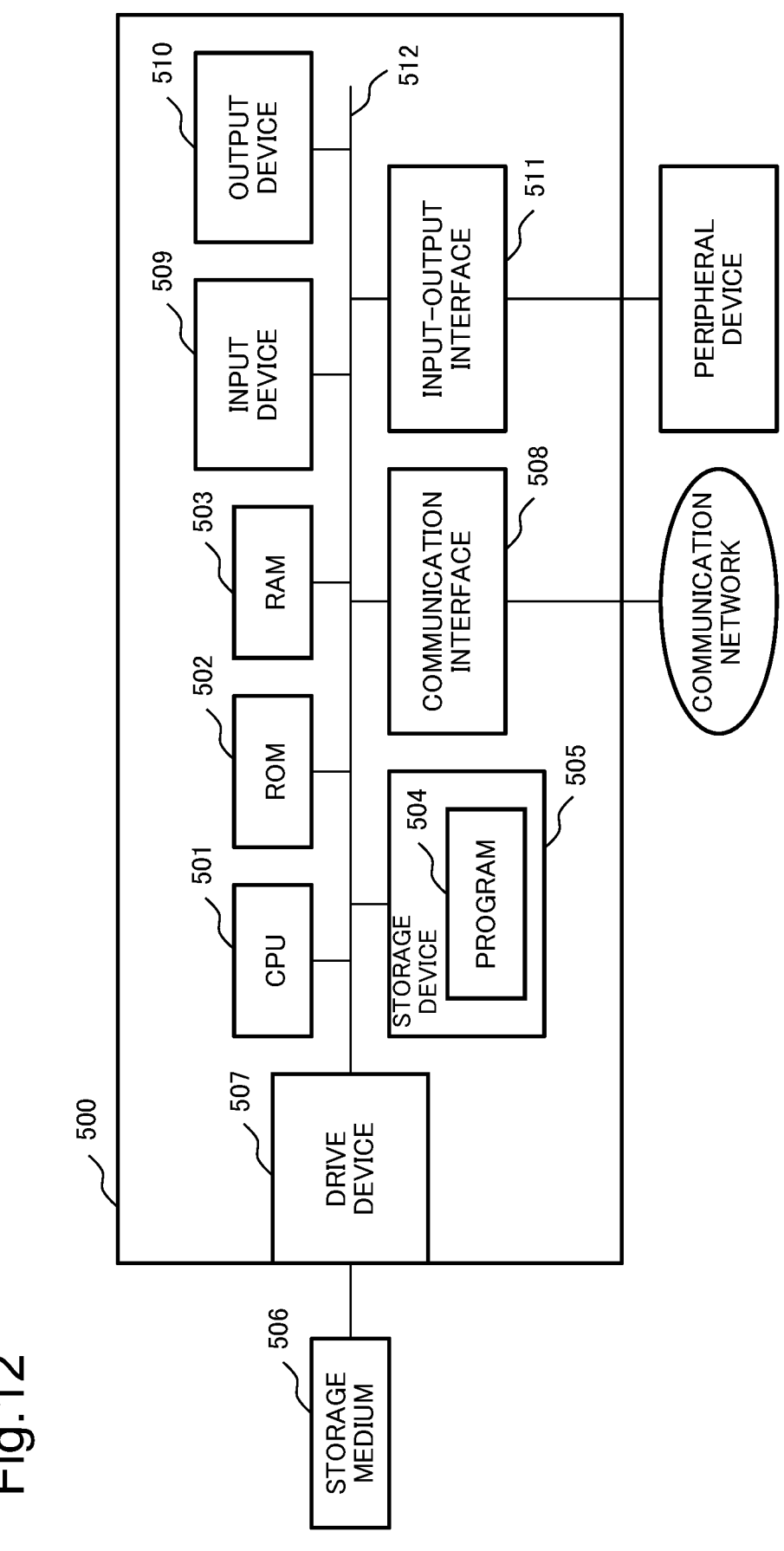
FIG. 12 is a block diagram illustrating an example of a hardware configuration of a computer 500.

FIG. 12 is a block diagram illustrating an example of a hardware configuration of the computer 500. Referring to FIG. 12, the computer 500 includes, for example, a central processing unit (CPU) 501, a read only memory (ROM) 502, a random access memory (RAM) 503, a program 504, a storage device 505, a drive device 507, a communication interface 508, an input device 509, an input-output interface 511, and a bus 512.

The program 504 includes instructions for achieving the functions of each device. The program 504 is stored in advance in the ROM 502, the RAM 503, and/or the storage device 505. The CPU 501 achieves the functions of each device by executing instructions included in the program 504. For example, when the CPU 501 of the service providing apparatus 100 executes instructions included in the program 504, the service providing apparatus 100 implements the functions of the request reception unit 110, the agent selecting unit 130, the identification information issuing unit 140, the agent instruction unit 150, the payment result acquisition unit 160, the notice reception unit 170, and the payment processing unit 180. The RAM 503 may store data to be processed in the functions of each device. For example, the RAM 503 of the service providing apparatus 100 may store the client information, the agent information, the request information, and the instruction information.

The drive device 507 reads and/or writes on the recording medium 506. The communication interface 508 provides an interface with a communication network. The input device 509 includes, for example, a mouse, a keyboard, and/or the like, and receives an input of information from an administrator or the like. The output device 510 is, for example, a display and outputs (displays) information to an administrator or the like. The input-output interface 511 provides an interface with a peripheral device. The reader 32 described above is connected to the input-output interface 511. The bus 512 connects these hardware components. The program 504 may be supplied to the CPU 501 via a communication network, or may be stored in the recording medium 506 in advance, read by the drive device 507, and supplied to the CPU 501.

The hardware configuration illustrated in FIG. 12 is an example, and other components may be added or some of the components are not necessary to be included.

There are various modification examples of the implementation method of each device. For example, each device may be achieved by any combination of a computer and a program different for each component. A plurality of components included in each device may be achieved by any combination of one computer and a program.

Some or all of the components of each device may be achieved by general-purpose or dedicated circuitry including a processor or the like, or a combination thereof. These circuits may be configured by a single chip or may be configured by a plurality of chips connected via a bus. Some or all of the components of each device may be achieved by a combination of the above-described circuit or the like and a program.

When some or all of the components of each device is achieved by a plurality of computers, circuits, and the like, the plurality of computers, circuits, and the like may be arranged in a centralized manner or in a distributed manner.

At least a part of the service providing apparatus 100 may be provided in a software as a service (SaaS) format. That is, at least a part of the functions for achieving the service providing apparatus 100 may be executed by software executed via a network.

While the present disclosure has been particularly shown and described with reference to exemplary embodiments thereof, the present disclosure is not limited to these embodiments. It will be understood by those of ordinary skill in the art that various changes in form and details may be made therein without departing from the spirit and scope of the present disclosure as defined by the claims. The configurations according to the example embodiments can be combined with each other without departing from the scope of the present disclosure.

This application is based upon and claims the benefit of priority from Japanese patent application No. 2020-062854, filed on Mar. 31, 2020, the disclosure of which is incorporated herein in its entirety by reference.

REFERENCE SIGNS LIST 1 service providing system
100 service providing apparatus
110 request reception unit
130 agent selecting unit
140 identification information issuing unit
150 agent instruction unit
160 payment result acquisition unit
170 notice reception unit
180 payment processing unit
190 registration information storage unit
10 client terminal
20 agent terminal
30 store terminal
400 payment server

What is claimed is:

1. A service providing system comprising:
a store terminal installed in a store;
a reader connected to the store terminal communicably in a wired or wireless manner to read identification information from an agent terminal;
a camera connected to the store terminal communicably in a wired or wireless manner to acquire image data of an agent;
a payment server storing identification information identifying an agent, biometric information of the agent, and payment information of a business operator in association with each other, wherein the business operator provides shopping agency service and intermediates payment between a client and the agent, wherein the payment server communicates with the store terminal via a network;
a registration information storage that stores agent information including biometric information of the agent;
at least one memory storing instructions; and
at least one processor configured to execute the instructions,
wherein the store terminal is configured to:
register a total price of products selected by the agent;
acquire the identification information of the agent from the agent terminal carried by the agent via the reader, wherein the identification information is encoded as one of a bar code and a two-dimensional code;
receive the image data from the camera, the image data being of a region including a face of the agent;
transmit an authentication request to the payment server via the network, the authentication request including the acquired identification information and the image data; and
process checkout related to purchase of a product, only in response to receiving a payment result from the payment server, without the agent bearing financial burden, wherein the payment server is configured to:
receive the authentication request from the store terminal via the network;
extract biometric information of the agent from the image data included in the authentication request, the biometric information being a feature value calculated from the image data of one of a face, an iris, veins, and a fingerprint of the agent;

check the identification information and the extracted biometric information included in the authentication request against the identification information and the biometric information stored to authenticate that a person who presents the agent terminal at the store terminal is the agent who has received a shopping request;

in a case where the identification information and the biometric information included in the authentication request matches the identification information and the biometric information stored, validate the identification information and authenticate the agent;

only upon the validation of the identification information and the authentication of the agent, perform payment between the store and the business operator using payment information of the business operator associated with identification information included in the authentication request; and transmit a notice of completion of payment processing to the store terminal, wherein the at least one processor is configured to execute the instructions to:

issue the identification information of the agent;

transmit the identification information issued and the biometric information of the agent stored in the registration information storage to the payment server to be stored in association with each other;

transmit, to the agent terminal, a purchase instruction of a product specified by the client, and the identification information;

acquire the payment result from the payment server, the payment result being related to the product purchased by the agent using the payment information of the business operator; and process, when receiving a notice indicating that the client has received the product from a terminal of the client, payment with payment information of the client from the client to the business operator based on the payment result.

2. The service providing system according to claim 1, wherein the at least one processor is further configured to execute the instructions to:

select the agent based on a condition of shopping requested by the client and conditions of a plurality of registered agents.

3. The service providing system according to claim 2, wherein the at least one processor is further configured to execute the instructions to:

select candidates for the agent, and select the agent from the candidates for the agent.

4. The service providing system according to claim 1, wherein the at least one processor is further configured to execute the instructions to:

store the encoded identification information of the agent together with the purchase instruction of the product.

5. The service providing system according to claim 1, wherein the at least one processor is further configured to execute the instructions to:

transmit, to the payment server, a name of a specific store where the identification information is valid for payment; and acquire the payment result related the product purchased at the specific store.

6. The service providing system according to claim 1, wherein the at least one processor is further configured to execute the instructions to:

transmit, to the payment server, an upper limit amount of use associated with the identification information.

7. The service providing system according to claim 1, wherein the identification information is displayed as a code on the agent terminal to be read at a store for payment.

8. A service providing method comprising:

issuing identification information identifying an agent;

storing, by a payment server that communicates with a store terminal installed in a store via a network, the identification information issued, biometric information of the agent, and payment information of a business operator in association with each other, wherein the business operator provides shopping agency service and intermediates payment between a client and the agent;

storing, by a registration information storage, agent information including biometric information of the agent;

transmitting, to an agent terminal, a purchase instruction of a product specified by the client, and the identification information;

registering a total price of products selected by the agent;

acquiring, by the store terminal, the identification information of the agent from the agent terminal carried by the agent via a reader connected to the store terminal communicably in a wired or wireless manner, wherein the identification information is encoded as one of a bar code and a two-dimensional code;

receiving image data from a camera connected to the store terminal, the image data being of a region including a face of the agent;

transmitting an authentication request to the payment server via the network, the authentication request including the acquired identification information and the image data;

receiving the authentication request from the store terminal via the network;

extracting biometric information of the agent from the image data included in the authentication request, the biometric information being a feature value calculated from the image data of one of a face, an iris, veins, and a fingerprint of the agent;

checking, by the payment server, the identification information and the biometric information included in the authentication request against the identification information and the biometric information stored to authenticate that a person who presents the agent terminal at the store terminal is the agent who has received a shopping request;

in a case where the identification information and the biometric information included in the authentication request matches the identification information and the biometric information stored, validating the identification information and authenticating the agent;

only upon validation of the identification information and authentication of the agent, performing, by the payment server, payment between the store and the business operator using payment information of the business operator associated with identification information included in the authentication request;

transmitting, by the payment server, a notice of completion of payment processing to the store terminal;

processing, by the store terminal, checkout related to purchase of a product, only in response to receiving a payment result from the payment server, without the agent bearing financial burden;

transmitting the identification information issued and the biometric information of the agent stored in the registration information storage to the payment server to be stored in association with each other;

acquiring the payment result from the payment server, the payment result being related to the product purchased by the agent using the payment information of the business operator; and processing, when receiving a notice indicating that the client has received the product from a terminal of the client, payment with payment information of the client from the client to the business operator based on the payment result.

\* \* \* \* \*